United States Patent Office 3,319,553
Patented May 16, 1967

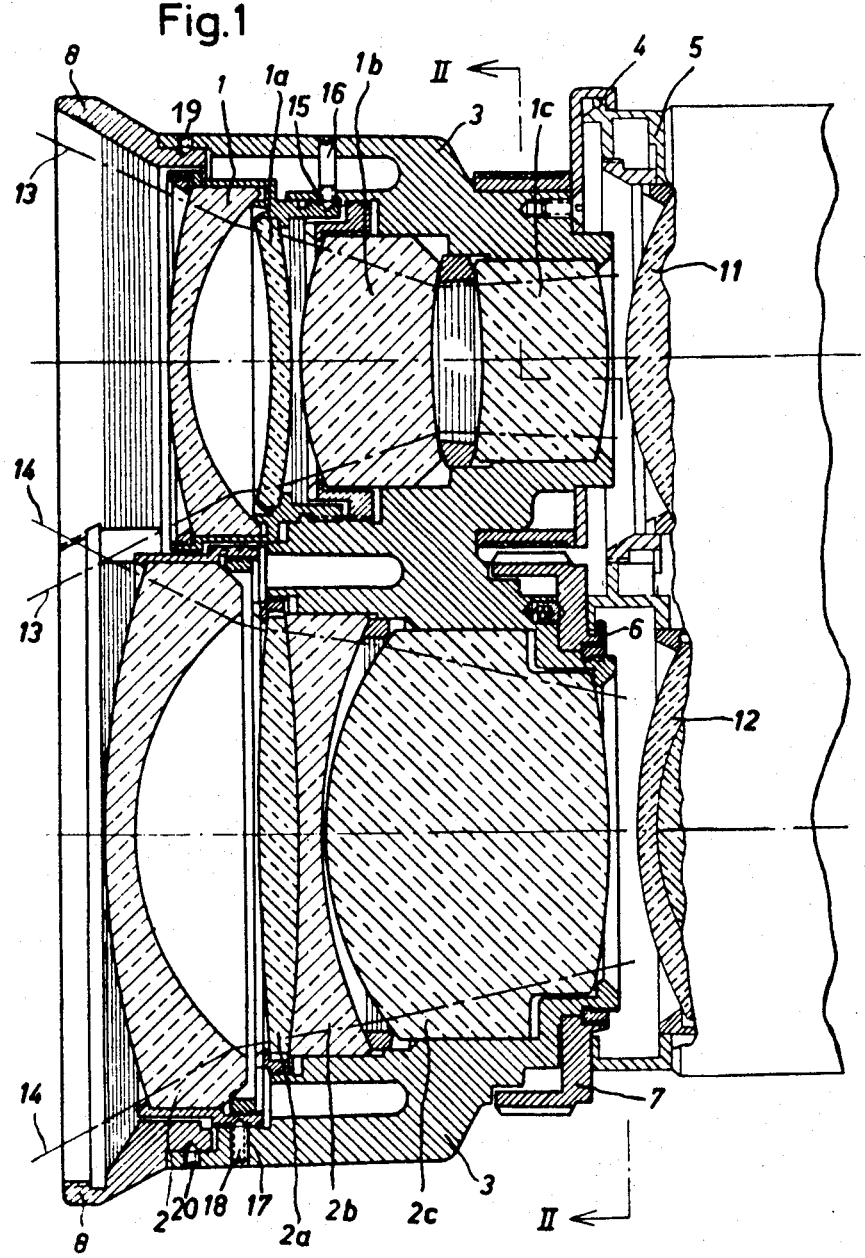

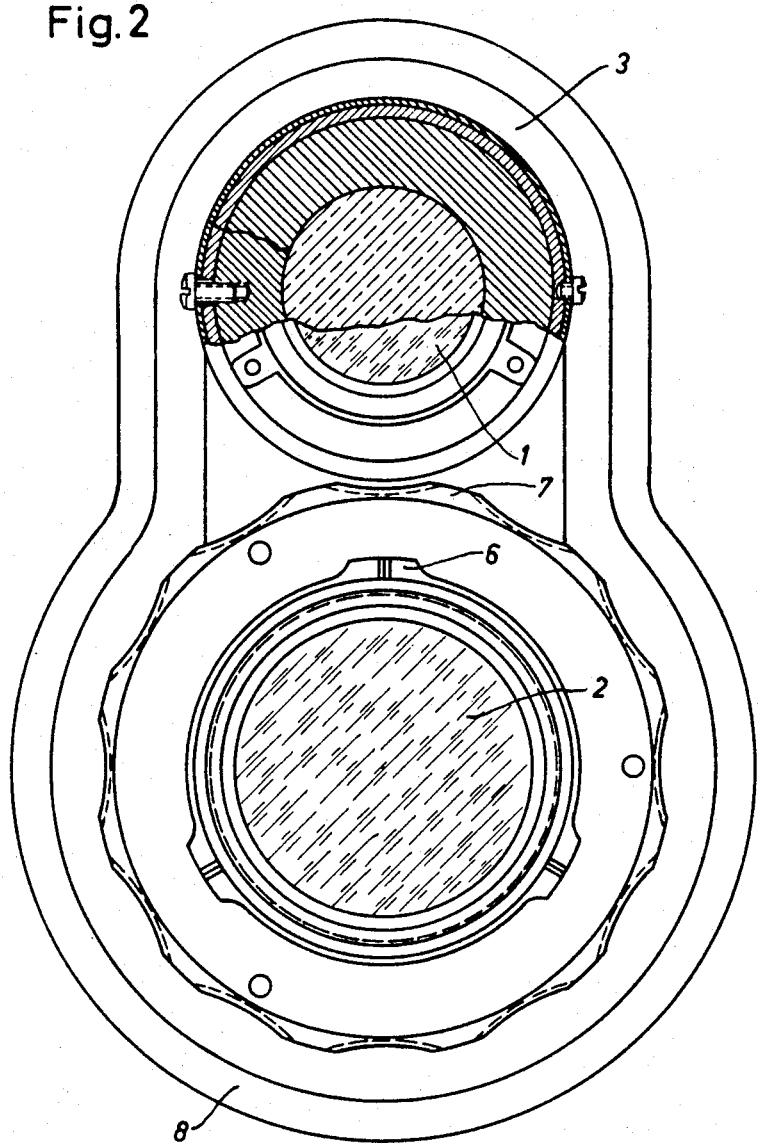

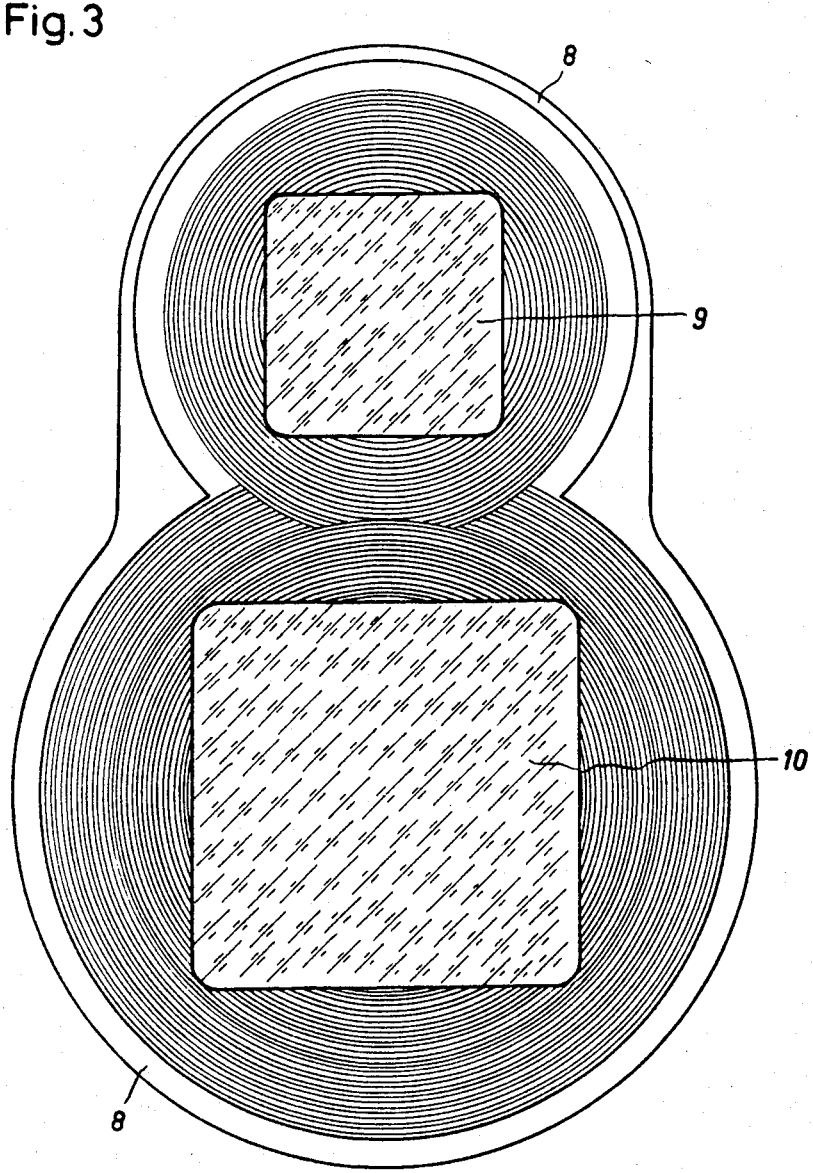

3,319,553
FRONT LENS ATTACHMENT FOR CHANGING THE FOCAL LENGTH IN TWO-LENS MIRROR REFLEX CAMERAS
Heinz Vogel, Schnaitheim, Heidenheim, Germany, assignor to Carl Zeiss-Stiftung, doing business as Carl Zeiss, Wurttemberg, Germany, a foundation established in Germany
Filed Sept. 23, 1963, Ser. No. 310,801
Claims priority, application Germany, Sept. 26, 1962, Z 8,086
5 Claims. (Cl. 95—44)

The invention relates to front lens attachments for changing the focal length of the objective of a two-lens mirror reflex camera and is particularly concerned with a detachable mount for these attachments.

In cameras with a built-in photographic objective it is possible to change the effective focal length when making an exposure by the employment of afocal telescopic attachment system. Depending on whether the telescopic magnification of the attachment system is larger or smaller than 1, it will increase or reduce the focal length of the photographic objective. The original form of such afocal attachment systems is the elementary Galilei telescope which consists of a collecting front lens and a dispersing rear lens. However, this simple Galilean telescope is no longer sufficient in afocal telescopic attachments to be used in front of camera objectives which have a large angular field. In order to obtain a satisfactory field correction, more elaborately devised systems are called for which are longer in axial direction and in which the front member has a relative large diameter compared with the diameter of the front member of the camera objective.

For the purpose of changing the focal length of the lenses in a two-lens mirror reflex camera it is necessary to arrange a pair of afocal telescopic attachments of equal telescopic magnification in front of the photographic objective and of the viewfinder objective if it is desired for the ground glass viewfinder to permit a checking of the picture up to and including the moment of the camera release. In order to create at least for the attachment for the photographic objective the best possible conditions for a field correction, it has proved necessary to make this attachment system with a larger diameter than the attachment system for the viewfinder. The two attachment systems for the photographic light beam and the viewfinder light beam were independently from one another attached by means of a screw or twist connection to the photographic objective and the viewfinder objective, respectively, or to a supporting plate arranged on the camera casing in front of these two objectives. In order to utilize the space between the optical axes of the photographic light beam and the viewfinder light beam for the optical components of the attachments for the photographic objective and the viewfinder objective, respectively, the outer diameters of the mounts of the attachment systems were made of such a size that the sum of the outer diameters was only little less than twice the distance of the optical axis of the viewfinder and the photographic objective.

In practice, these known rules for the construction of afocal attachments for the simultaneous change of the focal length in the photographic and the viewfinder light beam in two-lens mirror reflex cameras have not produced satisfactory results with respect to picture quality, because the required enlargement of the diameter of the front member of said attachments is limited by the distance between the optical axes of the photographic objective and the viewfinder objective.

It is an object of the invention to provide optimum conditions for an attachment pair for increasing or reducing the focal lengths of photographic and viewfinder objectives of a two-lens mirror reflex camera by constructing the mount for the optical elements in such a manner that a larger portion of the space between the two optical axes is available for the optical elements than is the case in known arrangements. For this purpose and in accordance with the invention, the optical components for both objectives are arranged in a common mount which may consist of a unitary die cast body. In this manner it is possible to provide a camera in which the photographic objective measured across the diagonal has a picture angle of 55° and in which the distance between the optical axes amounts to only about 60% of the focal length of the photographic objective. In front of the photographic objective and the viewfinder objective of such a camera an effective afocal attachment system can be arranged which will furnish a satisfactory focussing as well as sufficient illumination of the usually rectangular picture area including the corners of the same. In order to create the best possible conditions for the exposure light beam, it is preferred to so design the attachment that a stronger vignetting of the finder image is tolerated in order to be able to make the diameter of the front member for the exposure light beam larger than 110% of the space between the optical axes of the exposure light beam and the viewfinder light beam.

These and other object of the invention will now be described with reference to the accompanying drawings which illustrate by way of example a detachable front lens attachment for a two-lens mirror reflex camera.

In the drawings:
FIG. 1 is a vertical axial sectional view of the attachment and also shows a portion of the two-lens mirror reflex camera;
FIG. 2 is a cross-sectional view along the broken line II—II of FIG. 1, and
FIG. 3 is a front elevation view of a modified embodiment of an attachment in which the optical system comprises lenses of rectangular configuration.

The mount according to the invention constitutes a holder for two detachable front lenses, one for the exposure light beam and one for the viewfinder light beam, and is designed for use with a two-lens mirror reflex camera. The mount is so arranged that the centers of the front members of the attachments for the photographic objective and the viewfinder objective come so close to one another that the incident light beams which expose the film and which form the viewfinder image overlap within the space which is occupied by the common mount, as is shown by the light beams 13—13 and 14—14 indicated in FIG. 1. In certain respect it may be expedient to make the common mount not of one integral body, but of two die cast bodies which border at each other at a plane at a right angle to the optical axes in such a manner that one of the two parts 3 of the mount serves as a carrier for the optical elements, while the other part 8 forms a framelike body which is attached and secured by set screws 19 and 20 to the front of the first mentioned part and takes care of the coverage at the front and forms a protection for the lenses.

In a further development of the invention in order that the diameters of the optical elements of the attachment systems can be made as large as possible, the rotative symmetric form relative to the optical axis is dispensed with, even though this form may be desirable with respect to production and costs. In order to create still better conditions for the illumination of the corners of the picture area than is possible with circular optical elements, at least the edges of the optical elements arranged in the front are trimmed in the horizontal and vertical directions to substantially rectangular configurations as shown in FIG. 3.

The invention not only constitutes a substantial contribution to the art of optical design in that it provides for a satisfactory field correction particularly in the exposure ray path by means of afocal telescopic attachments, but it also as proved advantageous in actual practice. For increasing or decreasing the focal length simultaneously in exposure ray path and finder ray path, it is only necessary to attach or exchange a single unit. A further simplification is obtained in that the double attachment system is attached to the camera by means of a single thread or a bayonet ring arranged concentrically to the exposure ray path, while additional mechanical elements on the viewfinder attachment merely serve to orientate the attachment system also to the viewfinder ray path.

Referring now to the drawings, the ancillary lenses for the viewfinder are designated with 1, 1a, 1b and 1c, and the ancillary lenses for the camera objective are designated with 2, 2a, 2b and 2c. The common mount 3 for these two groups of lenses is attached to a support mount 5 on the front wall of the camera, firstly, in that it is hooked over an arc-shaped collar-like rim 4 on the upper part of the support mount 5 on the front wall of the casing 10 of the two-lens mirror reflex camera, and secondly, the mount 3 is fastened to support mount of the camera by means of an annular rotatable handle 7 arranged on a rotatable bayonet ring 6 carried by the support mount 5 and which is positioned concentrically to the exposure ray path passing through the lenses 2, 2a, 2b and 2c. The front portion of the mount 3 is provided with a shade portion 8 for the purpose of protecting the front lenses. Preferably, two of the front lenses, 1 and 1a, of the viewfinder and also at least the lens 2 of the camera objective are made accessible for axial adjustment by being mounted (FIG. 1) in threaded mounting rings 20 and 21, respectively, which are locked in their adjusted position by set screws 16, 17 and 17, 18 respectively. Both set screws 16 and 18 are accessible from the exterior of the mount 3. A part of the viewfinder lens system is designated with 11 and a part of the camera objective is designated with 12.

What I claim is:

1. A detachable device containing optical systems for changing the focal lengths of the objective lens and the viewfinder lens mounted in the front wall of a two-lens mirror reflex camera, said device comprising a single mount, two optical systems mounted therein about two parallel optical axes spaced from each other a distance which is about 60% of the focal length of said objective lens, and means for detachably attaching said mount to the body of said camera in front of the two lenses of the same, said means comprising a collar-like rib on the upper portion of said front wall from which said mount is suspended, and a locking ring on said mount for connecting the lower portion of said mount to said front wall, whereby simultaneously the focal length of both said lenses is changed, each one of said optical systems comprising a plurality of axially aligned lenses, the front lens of the optical system to be positioned in front of the objective lens of the camera having a diameter which is greater than 110% of the distance between the two optical axes of said objective lens and said finder lens, respectively.

2. A detachable device containing optical systems for changing the focal lengths of the objective lens and the viewfinder lens mounted in the front wall of a two-lens mirror reflex camera, said device comprising a single mount, two optical systems mounted therein about two parallel optical axes spaced from each other a distance which is about 60% of the focal length of said objective lens, and means for detachably attaching said mount to the body of said camera in front of the two lenses of the same, said means comprising an arcuate rib on the upper portion of said front wall from which said mount is suspended, and a bayonet locking member on the lower portion of said mount for connecting said mount to said camera whereby simultaneously the focal length of both said lenses is changed, each one of said optical systems comprising a plurality of axially aligned lenses, the front lens of the optical system to be positioned in front of the objective lens of the camera having a diameter which is greater than 110% of the distance between the two optical axes of said objective lens and said finder lens, respectively, whereby the greatest diameters of said two optical systems are of such a size that the paths of the rays forming the images on the film and in the viewfinder, respectively, overlap partially within the space formed within said common mount.

3. A detachable device containing optical systems for changing the focal lengths of the objective lens and the viewfinder lens mounted in the front wall of a two-lens mirror reflex camera, said device comprising a single mount, two optical systems mounted therein about two parallel optical axes spaced from each other a distance which is about 60% of the focal length of said objective lens, and means for detachably attaching said mount to the body of said camera in front of the two lenses of the same, said means comprising an arcuate collar-like rib on the upper portion of said front wall on which said mount is supported, and a bayonet locking ring on said mount for connecting the lower portion of said mount to said camera front wall, whereby simultaneously the focal length of both said lenses is changed, each one of said optical systems comprising a plurality of axially aligned lenses, the front lens of the optical system to be positioned in front of the objective lens of the camera having a diameter which is greater than 110% of the distance between the two optical axes of said objective lens and said finder lens, respectively, at least the front optical members of said optical systems having a non-circular shape in that they are cut along their edges along planes which are at right angles to the optical axes.

4. A detachable device containing optical systems for changing the focal lengths of the objective lens and the viewfinder lens mounted in the front wall of a two-lens mirror reflex camera, said device comprising a single mount, two optical systems mounted therein about two parallel optical axes spaced from each other a distance which is about 60% of the focal length of said objective lens, an arcuate collar on the upper portion of said front wall from which said mount is suspended, and a manually operable rotatable bayonet connecting member in the lower portion of said mount extending concentrically about the axis of the objective lens for detachably attaching said mount to the body of said camera in front of the two lenses of the same, whereby simultaneously the focal length of both said lenses is changed.

5. A detachable device containing optical systems for changing the focal lengths of the objective lens and the viewfinder lens mounted in the front wall of a two-lens mirror reflex camera, said device comprising a single mount, two optical systems mounted therein about two parallel optical axes spaced from each other a distance which is about 60% of the focal length of said objective lens, and means for detachably attaching said mount to the body of said camera in front of the two lenses of the same, said means comprising a supporting mount affixed to the front wall of said camera having openings corresponding to the location of said objective lens and viewfinder lens, a collar-like rim on the upper portion of said supporting mount from which said single mount is suspended, and a bayonet ring rotatably mounted on said single mount adapted to be releasably received in said opening for said viewfinder lens, whereby simultaneously the focal length of both said lenses is changed, each one of said optical systems comprising a plurality of axially aligned lenses, the front lens of the optical system to be positioned in front of the objective lens of the camera having a diameter which is greater than 110% of the distance between the two optical axes of said objective lens and said finder lens, respectively, said mount being subdivided along a plane extending at right angles to the optical axes of said two optical systems into two parts, one being attachable to the camera and containing said two optical systems which are each provided with means for individual focus adjustment, the other part forming a lens shade which is attached to said first part.

References Cited by the Examiner

UNITED STATES PATENTS

| | | | |
|---|---|---|---|
| 1,922,963 | 8/1933 | Lane | 95—18 X |
| 2,963,950 | 12/1960 | Faasch | 95—44 |
| 3,067,664 | 12/1962 | Winslow | 95—44 |

FOREIGN PATENTS 1,128,286  4/1962  Germany.

JOHN M. HORAN, *Primary Examiner.*